(12) United States Patent
Lifshitz (10) Patent No.: US 11,483,278 B1
(45) Date of Patent: Oct. 25, 2022

(54) SYSTEM, DEVICE, AND METHOD OF RESOLVING INTERNET PROTOCOL (IP) ADDRESSES OF DEVICES IN A COMMUNICATION NETWORK

(71) Applicant: ALLOT LTD., Hod HaSharon (IL)

(72) Inventor: Boris Lifshitz, Kokhav Yair (IL)

(73) Assignee: ALLOT LTD., Hod Hasharon (IL)

( * ) Notice: Subject to any disclaimer, the term of this patent is extended or adjusted under 35 U.S.C. 154(b) by 0 days.

(21) Appl. No.: 17/509,005

(22) Filed: Oct. 24, 2021

(51) Int. Cl.
| | | |
|---|---|---|
| G06F 15/173 | (2006.01) | |
| H04W 72/04 | (2009.01) | |
| H04L 29/12 | (2006.01) | |
| H04L 61/10 | (2022.01) | |
| H04L 61/5007 | (2022.01) | |
| H04L 61/5046 | (2022.01) | |

(52) U.S. Cl.
CPC .......... *H04L 61/10* (2013.01); *H04L 61/5007* (2022.05); *H04L 61/5046* (2022.05)

(58) Field of Classification Search
CPC ................. H04L 61/10; H04L 61/5007; H04L 61/5046
See application file for complete search history.

(56) References Cited

U.S. PATENT DOCUMENTS

| | | | | |
|---|---|---|---|---|
| 10,887,276 | B1 * | 1/2021 | Parulkar | ............. H04L 61/4511 |
| 11,121,976 | B2 * | 9/2021 | Plat | ..................... H04L 47/2416 |
| 11,240,544 | B1 * | 2/2022 | Vaidberg | ............ H04N 21/2407 |
| 11,323,310 | B2 * | 5/2022 | Zilbershtein | ........ H04L 41/0668 |
| 11,323,884 | B2 * | 5/2022 | Lifshitz | ................... H04W 4/70 |
| 2012/0147834 | A1 * | 6/2012 | Zisimopoulos | ......... H04W 8/12 370/328 |
| 2020/0053802 | A1 * | 2/2020 | Li | ........................... H04W 4/70 |
| 2020/0329008 | A1 * | 10/2020 | Dao | ..................... G06F 16/953 |

FOREIGN PATENT DOCUMENTS

| WO | WO-2016144230 | A1 * | 9/2016 |
|---|---|---|---|
| WO | WO-2022008951 | A1 * | 1/2022 |

\* cited by examiner

*Primary Examiner* — Christopher B Robinson
(74) *Attorney, Agent, or Firm* — Browdy and Neimark, PLLC (57) ABSTRACT

Systems, devices, and methods for resolving the original private Internet Protocol (IP) address of a User Equipment (UE) device in a cellular communication network; particularly where the UE device is behind a Network Address Translation (NAT) service which replaces the original private IP address of the UE device with a replacement public IP address. An IP address resolver performs an active resolution process which injects a new IP packet to the network, or performs a passive or comparison-based resolution process which compares headers of IP packets, to determine a pair of (i) an original private IP address of a particular UE device, and (ii) a replacement public IP address that is assigned to the UE device by a User Plane Function (UPF) unit. The correlation data or IP address mapping data is provided to servers or applications, to enable them to provide services to the UE device using its original private IP address.

26 Claims, 4 Drawing Sheets

SYSTEM, DEVICE, AND METHOD OF RESOLVING INTERNET PROTOCOL (IP) ADDRESSES OF DEVICES IN A COMMUNICATION NETWORK

FIELD

Some embodiments are related to the field of communication networks.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments provide systems, devices, and methods for resolving or determining or detecting the original private Internet Protocol (IP) address of an electronic device or a User Equipment (UE) device in a communication network; and particularly, in a 5G cellular communication network; and particularly, in a situation where the UE device is located behind a Network Address Translation (NAT) service or a Carrier Grade NAT (CGNAT) service which replaces the original private IP address of the UE device with a replacement public IP address.

Some embodiments may provide other and/or additional advantages and/or benefits.

DETAILED DESCRIPTION OF SOME DEMONSTRATIVE EMBODIMENTS

The Applicants have realized that communication network, such as 5G cellular networks, may improve or enhance systems in various areas; for example, industrial and manufacturing systems, smart cities, healthcare systems, IoT devices that are used in various fields, autonomous vehicles and smart vehicles, holographic communication, Virtual Reality (VR) and Augmented Reality (AR), and many more.

The Applicants have realized that new capabilities and new functionalities may depend on the ability to deploy a large number of new applications, and provide them with user-related insights. Such insights ad data may be indexed by, or may be associated with, a permanent indicator or identifier of a particular User Equipment (UE) device or electronic device; for example, a SUPI value, or a GPSI value, or a combination thereof. For example, every time that a UE device requests a communication session, the 5G Core Network (5GCN) allocates a private Internet Protocol (IP) address for that UE device; and in some situations, a single UE device may hold (or may be associated with) several different IP addresses. All the IP addresses that are associated with the same single SUPI and/or GPSI, are available for various Applications through the relevant 5GCN interfaces.

The Applicants have realized that by fetching or obtaining the private IP address of a particular UE device, for a relevant communication session thereof, Applications that are deployed outside of (or externally to) the 5GCN can guide a Software Defined Network (SDN) to re-route the relevant traffic in order to provide a particular service to that UE device.

The Applicants have further realized that some service providers (e.g., cellular service providers) may deploy a Network Address Translation (NAT) service or a Carrier Grade NAT (CGNAT) service, as an integrated part of the User Plane Function (UPF). In such case, the UPF replaces the private IP address and the private Port ("IP:Port") with a public IP address and a public IP:Port (or, with a range of port numbers), in outbound UE traffic (e.g., in traffic that is outgoing from the UE device). In such situations, realized the Applicants, a conventional SDN may not be able to recognize (or to detect, or to distinguish) the traffic of the particular UE device, and such traffic is not forwarded to the relevant Application, which in turn is not able to properly serve that particular UE device.

The Applicants have realized that in order to solve such problems, Application should be aware of the IP address mapping that took place in the UPF; and should use the public IP address instead of the private one when it guides the SDN. Accordingly, some embodiments provide various methods and systems that enable Application to fetch or to obtain an IP address table or an IP mapping table, from the UPF, in real-time or in near real time; and/or methods and systems to detect or to determine an original IP address or a hidden IP address or a private IP address or a non-public IP address or a replaced IP address, of a device that is located behind a NAT service or a CGNAT service or other IP-address-replacement service or other IP-address-rewriting service or other IP-address-sharing service.

Some embodiments perform real-time or near-real-time construction or reconstruction of an IP addresses map of a UPF, and/or or an IP addresses map of a NAT service or unit, and/or of an IP addresses map of a CGNAT service or unit; and may provide such constructed or reconstructed IP addresses map (or portion(s) thereof) to one or more third-party applications or devices (e.g., a remote server, a web server, an application server, a cloud-computing server).

Figure 1A:
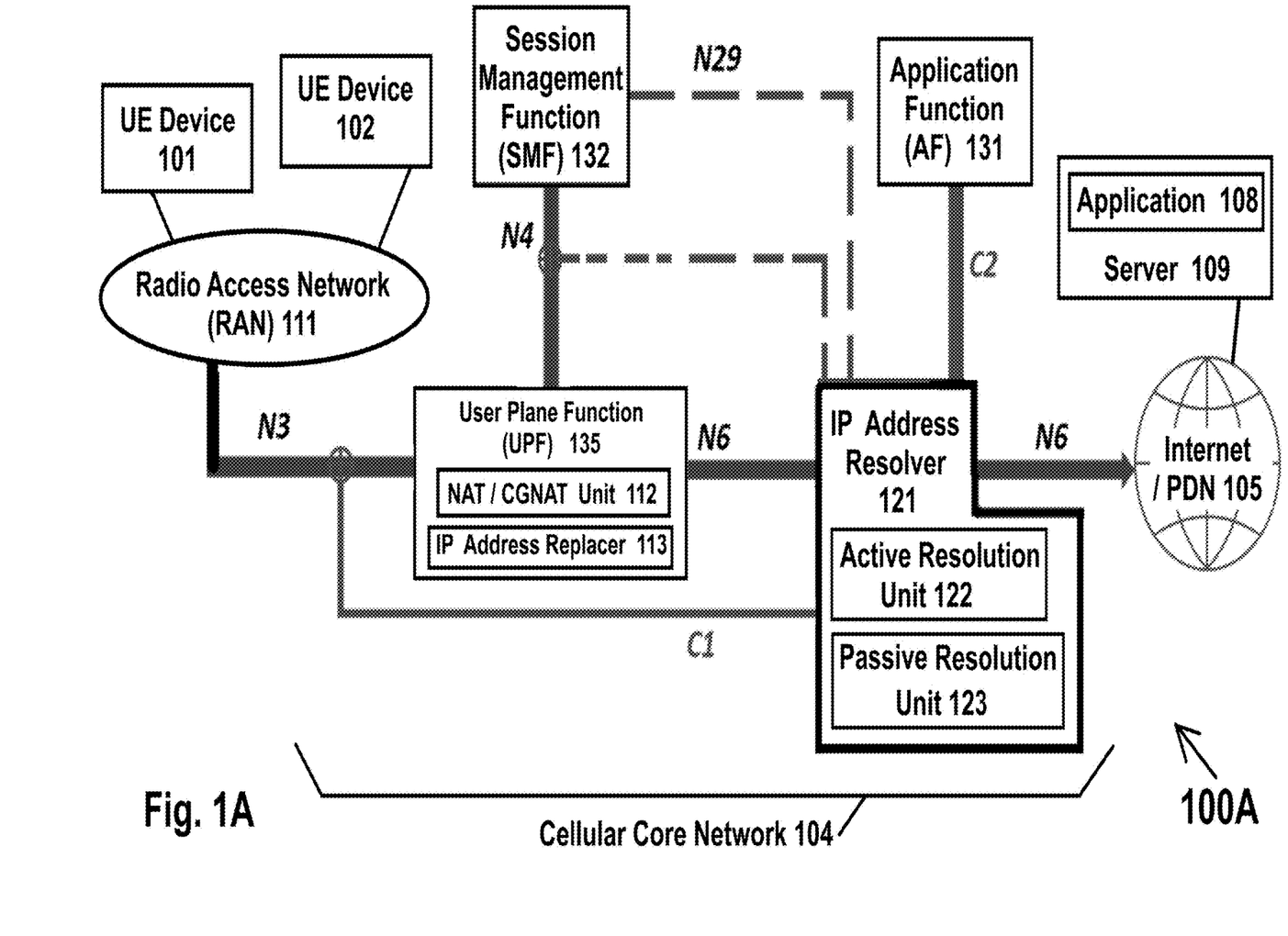
FIG. 1A is a schematic block diagram illustration of a system, demonstrating an in-line deployment of an IP Address Resolver, in accordance with some demonstrative embodiments.
Figure 1B:
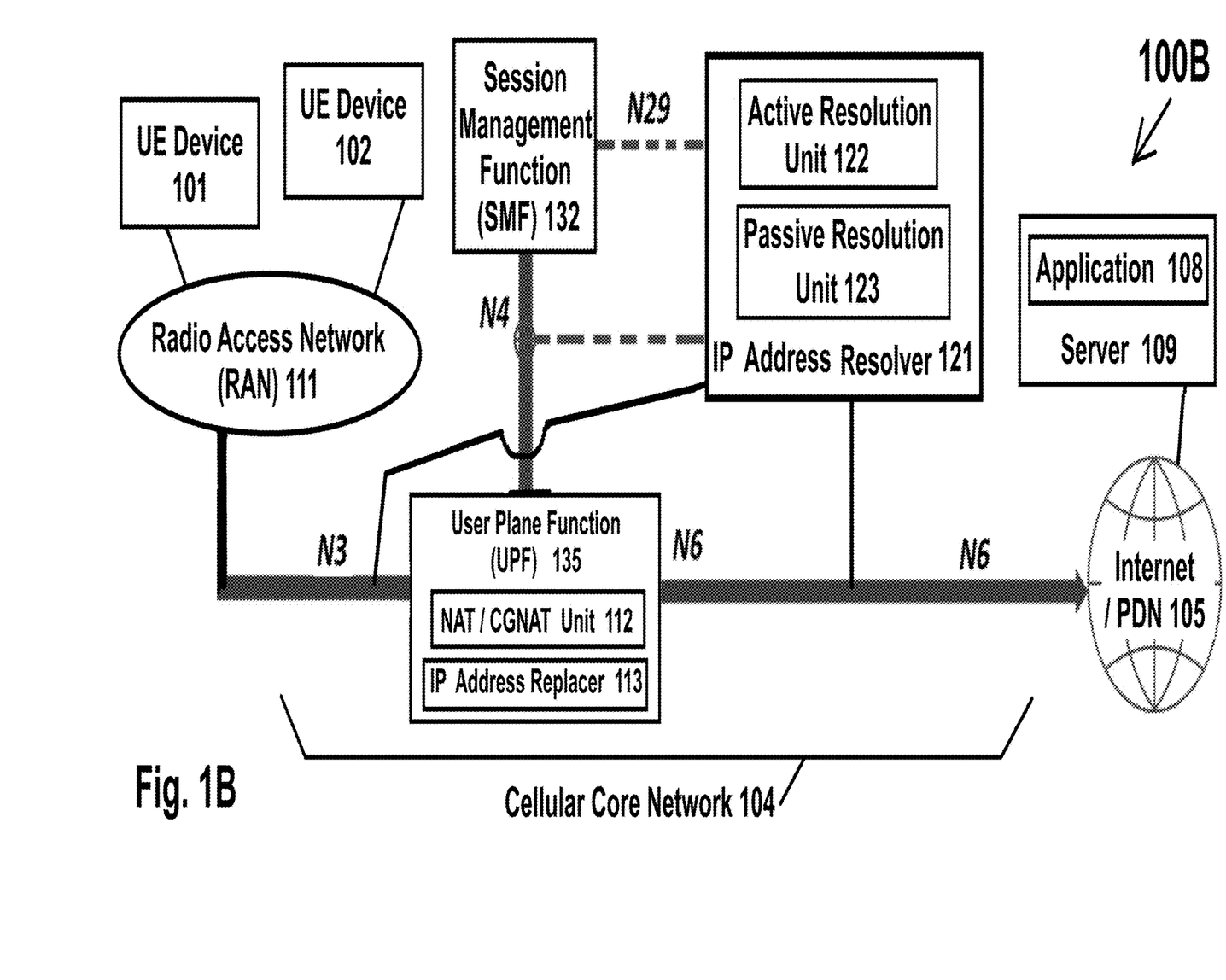
FIG. 1B is a schematic block diagram illustration of a system, demonstrating an in-parallel deployment of an IP Address Resolver, in accordance with some demonstrative embodiments.

Reference is made to FIG. 1A, which is a schematic block diagram illustration of a system 100A, demonstrating an in-line deployment of an IP Address Resolver, in accordance with some demonstrative embodiments. Reference is also made to FIG. 1B, which is a schematic block diagram illustration of a system 100B, demonstrating an in-parallel deployment of an IP Address Resolver, in accordance with some demonstrative embodiments.

As shown in FIG. 1A, the system includes one or more User Equipment (UE) devices; for example, UE device 101 and UE device 102 are shown. Each UE device may be capable of cellular communication, via a cellular transceiver that communicates over 5G or 4G LTE or 4G or 3G or 2G or other cellular communication protocol scheme. For example, UE device 101 may be a smartphone; UE device 102 may be a cellular-capable tablet; or the like. In some embodiments, UE device 101 and UE device 102 are not co-located, and/or are not co-owned by the same entity, and/or are not part of a same communication network; for example, UE device 101 may be a smartphone held by a first user in Manhattan, and UE device 102 may be a cellular-capable tablet held by a second user in Brooklyn.

Each one of UE devices 101-102 may wirelessly communicate with a Radio Area Network (RAN) 111, which in turn communicates with a Cellular Core Network 104, which thus enables each one of UE devices 101-102 to access the Internet or a Public Data Network (PDN) (denoted as "Internet/PDN" 105); which enables communication between such UE device(s) (101, 102) and a Server 109 (e.g., a web server, an application server, a cloud-computing server) which runs one or more application(s) 108 (e.g., server-side applications).

Each one of UE devices 101-102 has an "original", private, IP address, or a unique IP address. For example, the original private IP address of UE Device 101 is "1.2.3.4"; and the original private IP address of UE device 102 is "5.6.7.8". These original or the private IP addresses are assigned to each UE device (101, 102) by either a Session Management Function (SMF) 132 or a User Plane Function (135). However, the User Plane Function (UPF) 135 may include a NAT/CGNAT unit 112, which may replace the original private IP address of a UE device, with a different IP address ("the replacement IP address" or "the public IP address"), accompanies by an IP port number or range-of-numbers; which are then publicly advertised as belonging to such UE device. In an example, the NAT/CGNAT unit 112 may assign the same, shared, Replacement IP Address "99.88.77.66" to each one of UE device 101 and UE device 102; for example, by assigning to UE device 101 the IP address "99.88.77.66" and the IP Port range of 1 to 80; and, by assigning to UE device 102 the same IP address "99.88.77.66" but the IP Port range of 81 to 160. The assigning may be performed, for example, upon receiving a first packet or a first PDU request, from each respective UE device. Such replacement operations or IP-and-Port-Range allocation operations or assigning operations, may be performed by an IP Address Replacer 113, or other suitable unit or component which may be part of NAT/CGNAT unit 112 or may be operably associated with NAT/CGNAT unit 112; and optionally using an Addresses Map to track the correlation among replaced IP address and original private IP addresses of UE device(s). In accordance with some embodiments, an IP Address Resolver Unit is operable to remotely identify or detect or determine or map these IP address and Port range allocations or assignments or replacements.

In accordance with some embodiments, an IP Address Resolver 121 is deployed or connected in Cellular Core Network. For example, IP Address Resolver 121 is a network element or a network node, which may be deployed on N6 interface or communication link (e.g., as an in-line component; or as an in-parallel component; wherein N6 is the interface between User Plane Function (UPF) 135 and the Internet/PDN 105); and is also deployed or connected on N3 interface or communication link (e.g., in parallel, via a C1 interface or communication link). In system 100A of FIG. 1A, the IP Address Resolver 121 is deployed or connected in-line; whereas, in system 100B of FIG. 1B, the IP Address Resolver 121 is deployed or connected in-parallel. In some embodiments, the in-parallel deployment of IP Address Resolver 121 may be easier to deploy; however, in some situations, IP Address Resolver 121 may optionally be implemented as an integrated component of Policy Enforcement Function(s) (PEF units) and thus may be deployed in-line (e.g., to further perform Traffic Management, Policy Control and Charging, User Plane protection, and/or other operations).

IP Address Resolver 121 is also connected (e.g., via a C2 interface or communication link) to Application Function (AF) 131 of Cellular Core Network 104. IP Address Resolver 121 is also connected (e.g., via N6 interface or communication link) to User Plane Function (UPF) 135 of Cellular Core Network 104; and the UPF 135 is connected to RAN 111 (e.g., via N3 interface or communication link).

Session Management Function (SMF) 132 is connected to UPF 135 (e.g., via N4 interface); and IP Address Resolver 121 is further connected to the N4 interface (which connects the SMF 132 and the UPF 133). In some embodiments, IP Address Resolver 121 obtains information about a new session request of a UE device, and about the assigned private IP address, by listening to the N4 interface. In other embodiments, IP Address Resolver 121 obtains such information from the SMF 132 via the N29 interface; and in such case, the IP Address Resolver 121 is registered as Network Exposure Function (NEF) 136.

Referring to FIGS. 1A and 1B, every time that a new Protocol Data Unit (PDU) session is established between a UE device (101 or 102) and Internet/PDN 105, the NAT/CGNAT Unit 112 as part of the UPF 135 allocates to that UE device a public IP address (replacement IP address) from a pool of shared IP addresses, and also allocates to that UE device a block or range of Ports. The number of ports in the block (or range) is provisional; and it is typically equal in every such allocation event. The same number of ports (e.g., per each UE device) is also provisioned in the IP Address Resolver 121.

Based on one or more rules or parameters (e.g., indicating the preferences of the Cellular Service Provider; based on the network performance or network load; or the like), the IP Address Resolver 121 may activate or may utilize one of two methods for IP Address Resolution: (i) Active Resolution of IP Addresses, performed at an Active Resolution Unit 122 by injecting a packet on N3 interface in order to obtain the public IP address on the N6 interface; or (ii) Passive Resolution of IP Addresses, performed at a Passive Resolution Unit 123 by comparing a packet received on the N3 interface with a packet received on the N6 interface and performing matching of packet pairs for IP address resolution.

Service subscription and notification: In order to obtain IP Addresses Maps, the Application Function (AF) 131 is configured to subscribe to the Address Resolution Service of the IP Address Resolver 121. The subscription includes callback Uniform Resource Identifier (URI), and one or more of the following lookup criteria: all UE devices; SUPI and/or GPSI of a particular UE device; List of SUPI/GPSI values of various UE devices; the public IP:Port pair of a UE device; the destination IP:Port pair; a Data Network Name (DNN) value; a Tracking Area Index (TAI) value; and/or other suitable parameter(s). The IP Address Resolver 121 performs a search based on the queried parameter(s), and upon finding a match, the IP Address Resolver 121 notifies the subscribed application with the private IP:Port pair and the public IP:Port pair.

Tracking PDU Session Creation operations and PDU Session Release operations: the NAT/CGNAT unit 112 of the UPF 135 allocates a Public IP Address and a block of Ports upon a new PDU Session Creation request; and releases such pair (IP address and block-of-Ports) upon a corresponding PDU Session Release request. The PDU Session Creation indicator and/or the PDU Session Release indicator may be obtained by one or more ways; for example, by subscription to "Nsmf_EventExposure" service of the SMF 132, and/or by monitoring the N4 interface between the SMF and the UPF. In both cases, the private IP Address is provided in the message exchange (for example, in the first case, in the "Nsmf_EventExposure_Notify"; and in the second case, in the N4 interface's PDU Session Creation Request if the SMF 132 allocated the IP address, or in the Acknowledgement (ACK) of the PDU Session Creation on the N4 interface (if the UPF 135 allocated the Private IP Address).

In accordance with Active Resolution of IP Addresses: upon receiving an indication of a new PDU Session Creation, with UE device's private IP address (e.g., via N29 interface or via N4 interface), the IP Address Resolver 121 injects a packet on the N3 interface, with the received value of the UE device's private IP address in the "Source Address" field of the packet header and in the packet payload, and with the IP Address Resolver's own IP address on N6 in the "Destination Address" field of the packet header. The UPF 135 then replaces the UE device's private IP address with the allocated IP:Port; wherein the Port value is the first Port in the allocated Port block (since this is the first packet from that particular UE device).

The IP Address Resolver 121 receives the packet with the UE device's public IP address and with the first-in-range Port in the "Source Address" field of the packet header, and with the original private IP (of that UE device) in the packet payload. Both of these values, and other PDU Session parameters (e.g., DNN value, TAI value) are stored by the IP Address Resolver in an IP Addresses Map (or table, or dataset), until arrival or detection of a corresponding PDU Session Release request or indicator for that particular PDU Session. The IP Address Resolver 121 notifies any application(s) that pre-subscribed to receive the private IP address of the UE device, or notifies any application that sent a GET request with lookup criteria or query parameter(s) that matches the relevant PDU Session parameter(s).

Figure 2A:
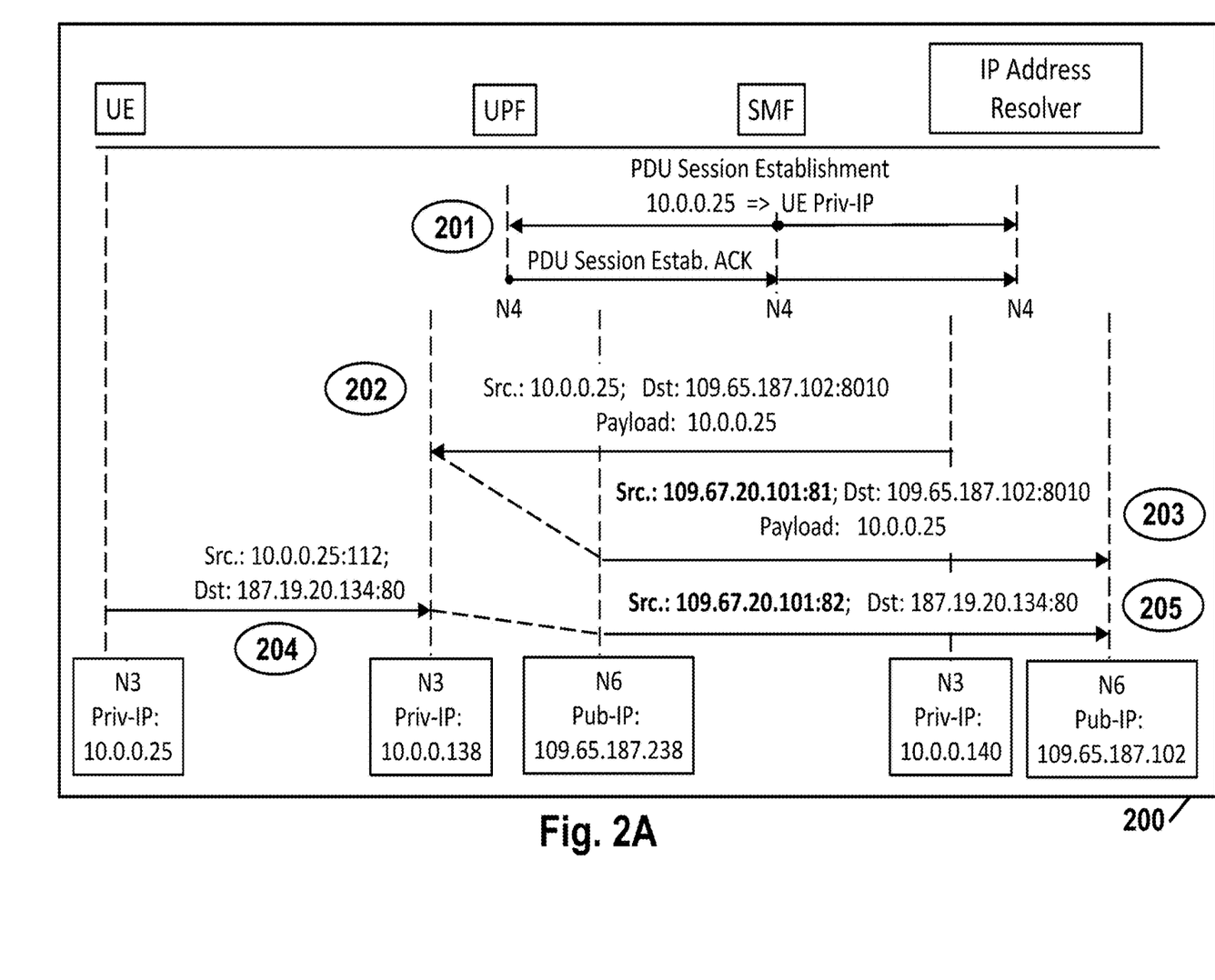
FIG. 2A is an illustration of a chart demonstrating a flow of operations for Active Resolution of a private IP address of a UE device, in accordance with some demonstrative embodiments.

Reference is made to FIG. 2A, which is an illustration of a chart 200 demonstrating a flow of operations for Active Resolution of a private IP address of a UE device, in accordance with some demonstrative embodiments.

As indicated by block 201, a PDU session is established or created. A private IP address of the UE device (e.g., "10.0.0.25") is known to the UPF and/or the SMF, as they exchange or transfer a PDU Session Creation request and a PDU Session Creation request acknowledgment (ACK) via the N4 interface to which the IP Address Resolver is also connected; and thus the IP Address Resolver initially obtains the private IP address of the UE device. The IP Address Resolver may then operate to actively correlate or match between the private IP address of the UE device, and a particular public IP address that is assigned by the UPF and/or the SMF to that UE device.

As indicated by block 202, the IP Address Resolver creates or constructs or generates an IP packet, and particular constructs in that IP packet: (i) an IP header, in which the Source Address is the private IP address of the UE device (e.g., "10.0.0.25"), and in which the Destination Address is the IP address (and optionally, a relevant Port number) of the IP Address Resolver itself (e.g., "109.65.187.102:8010"); and (ii) an IP packet payload, which includes a string or other digital representation of the private IP address of the UE device (e.g., "10.0.0.25").

As indicated by block 203, the UPF receives that IP packet from the IP Address Resolver; and replaces or modifies or updates the IP header of that IP packet; For example, the Source Address field of the IP packet, is replaced from having the private IP address of the UE device (e.g., "10.0.0.25") to having a replacement, optionally shared, public IP address (e.g., "109.67.20.101:81") which also includes a first-available Port number or a next-available Port number. The Destination Address field of that IP header of that IP packet is maintained unchanged; and the payload of that IP packet is maintained unchanged. The modified IP packet is received by ty IP Address Resolver, since its own IP address is still the Destination Address in the modified IP header of that modified IP packet. The IP Address Resolver now correlates or matches, or performs address mapping: the payload of the modified IP packet still carries and indicates to the IP Address Resolver the private IP address of the UE device, and the Source Address field in the modified IP packet indicates to the IP address resolver the public IP address (or the replacement IP address) that was assigned by the UPF and/or SMF to that UE device. The IP Address Resolver now knows, and can map and correlate, that the original private IP address of the UE device (e.g., "10.0.0.25"), corresponds to the public IP address (and Port number) as obtained from the Source Field of the modified IP packet (e.g., "109.67.20.101:81").

As indicated by block 204, the UE device may later send a new IP packet, having an IP header in which the Source Address field is the private IP address of the UE device, and having a Destination Address field of a particular server (e.g., an application server, a web server, or other destination). As indicated by block 205, the UPF replaces the value of the Source Address field of the IP header of that packet, such that it reflects the public IP address that was allocated to that UE device by the UPF (e.g., "109.67.20.101") followed by the next-available Port number (e.g., Port 82, as Port 81 was used in the previous communication mentioned above). The IP Address Resolver is able to inform third-party application(s), such as an application server or a web server, about the private IP address of the UE device; since the IP Address Resolver has already determined that private IP address of the UE device. As a result of the above flow of operations, the IP Address Resolver can notify any subscribed application(s) that this specific UE device has a private IP address of "10.0.0.25" which is replaced with (or correlates to, or maps to, or corresponds to) a public IP address of "109.67.20.101" having an appended Port number, which starts at StartPort=81, and which ends at End-Port=81+n, wherein "n" is a predefined positive integer that corresponds to the range-size of Ports in a block-of-ports that is assigned by the UPF. Once the IP Address Resolver determines the correlation between (i) a particular Public IP address and port number (or ports range) that were assigned for a particular PDU session of a particular UE device, and (ii) the original Private IP address of that UE device, the IP Address Resolver notifies such information to the subscribed applications Apps (e.g., providing to them the address pair and Ports range); the number of ports (n) is a provisioned or pre-defined value which may be obtained from the UPF or the NAT/CGNAT. From that time and onwards, all the subsequent IP messaging between that particular UE device and that server, are no longer analyzed by the IP Address Resolver, as the correlation or the association or the mapping was already determined.

Figure 2B:
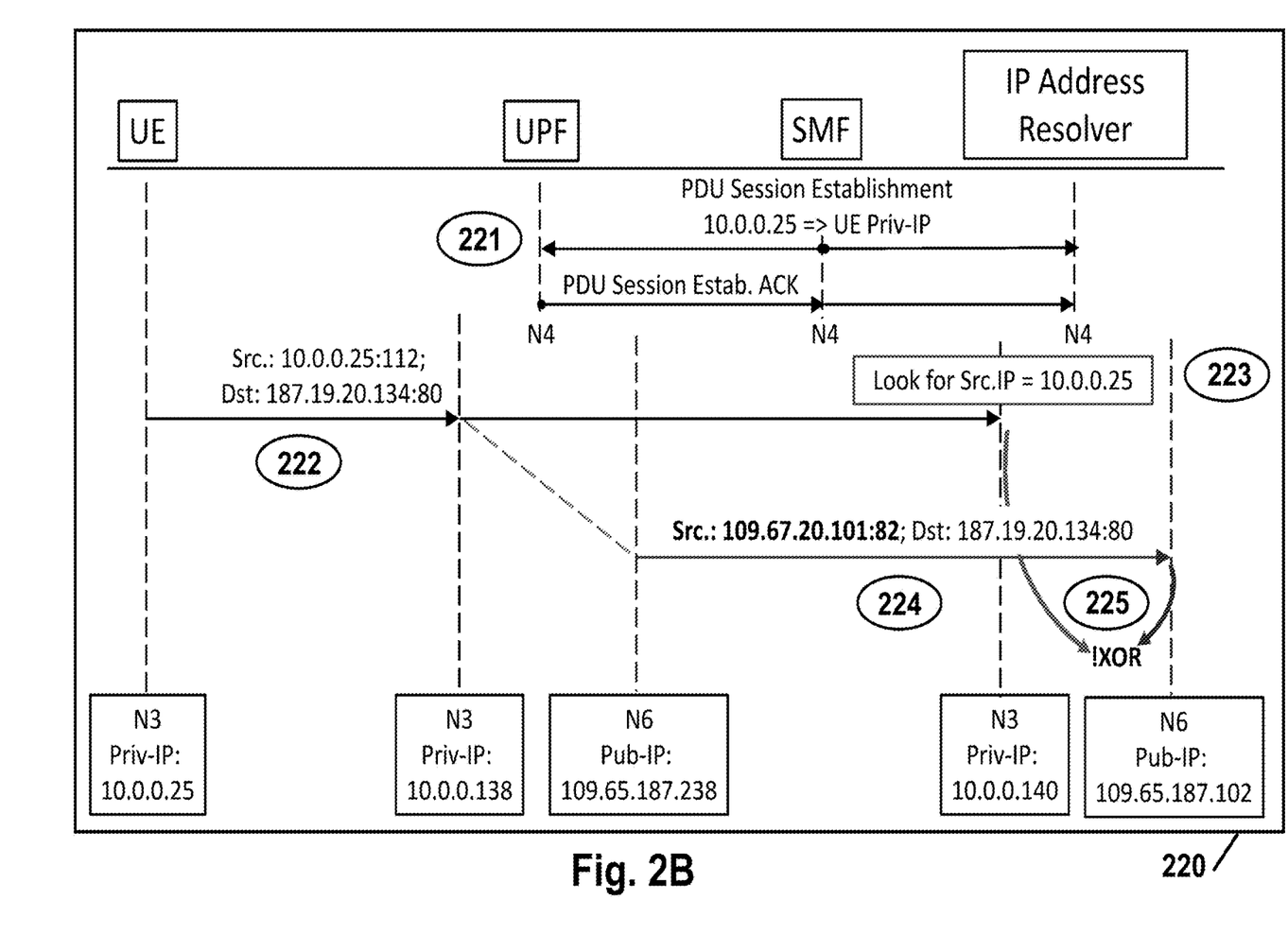
FIG. 2B is an illustration of a chart demonstrating a flow of operations for Passive Resolution of a private IP address of a UE device, in accordance with some demonstrative embodiments.

Reference is made to FIG. 2B, which is an illustration of a chart 220 demonstrating a flow of operations for Passive (or semi-passive, or comparison-based) Resolution of a private IP address of a UE device, in accordance with some demonstrative embodiments.

Firstly, a PDU session is created or established (block 221). The IP Address Resolver receives an indication about a new PDU Session establishment, with the private IP address of the UE device (e.g., on the N29 interface or the N4 interface). The IP Address Resolver thus has the private IP address of the UE device, but the IP Address Resolver does not yet know to which public IP address it would correlate, and such correlation would be performed via a unique comparison scheme (block 223) as detailed herein. Meanwhile, the IP Address Resolver reserves a new entry in an IP Addresses Map table, with the received value of the private IP address, and with a flag or indication of "Not_Resolved".

All messages that are received or transported via the N3 interface, with a private IP address that is Not Resolved, are stored in an IP address resolution queue with a corresponding time-stamp of arrive-time. For example, the UE device sends out an outgoing message, with an IP packet having an IP header with a Source Address field indicating its original private IP address, and with a particular Destination Address (e.g., a remote server); but the UPF replaces (block 224) the value in the Source Address field of the IP header to a public IP address (followed by a Port number, from a range of port-numbers or a block of port numbers).

The Applicants have realized that an outbound message (or an outgoing message, from the UE device towards a destination) will firstly arrive over the N3 interface and then over the N6 interface, due to a slight time delay cased by the NAT/CGNAT processing in the UPF. Therefore, in some situations, more than one message (or, more than one copy of the same message) may be stored in the N3 address resolution queue.

A message having an Unresolved public IP:Port, that is received via the N6 interface, is compared to all messages currently in the IP address resolution queue using an "Inverted Exclusive OR" logical operation (!XOR).

The Inverted Exclusive OR comparison (block 225) considers values from the IP header's fields: Destination IP Address; Destination IP Port; IP Protocol number; predefined Packet Comparison Rule (PCR) set; and/or other parameters. The PCR set includes rules per each Protocol number (e.g., maintained by Internet Assigned Numbers Authority) expected to be processed, and the default protocol number to be used if no associated PCR is found.

Each PCR value includes an offset in the message and a number of bytes for the comparison. For example, Offset=40; Number_of_Bytes=20, indicates that the comparison process will compare 20 bytes in both messages starting from byte number 40.

If two or more messages in the resolution queue, with different source IP address values, are determined to be identical, then the IP Address Resolver finds and selects the message with lowest (or earliest) arrive-time time-stamp; and the IP Address Resolver determines that the Source Address that appears in the IP header of that earliest message, is the private IP address which corresponds to one or more public IP addresses that appear in the other identical (but later-in-time) message(s). The resolved IP address pair (namely, the private IP address of the UE device, and the public IP address that appears in a later or subsequent identical message) is stored in an Address Map Table at the IP Address Resolver, until receiving or detecting a PDU Session Release request over the N4 interface or the N29 interface. Upon resolving an IP address pair, the corresponding message(s) are removed from the N3 resolution queue, or their flag is changed from Unresolved to Resolved, or their "Unresolved" flag is removed or deleted or toggled. Then, the IP Address Resolve notifies about the resolved IP address pair, to any application(s) that pre-subscribed to the address mapping service or the address resolution service, and/or to an application that sent a GET request with lookup criteria that matches the PDU session parameters.

In both the active IP resolution method and the passive IP resolution method, the IP Address Resolver may be deployed in a vendor-agnostic implementation that does not require a specific integration with a specific UPF of a specific Cellular Communication Provider; and/or without depending or relying on a particular configuration of the UPF; and/or without requiring any modification of a UPF unit or a UPF operational scheme. The vendor-independent IP address resolver operates to obtain the private IP address of the UE device over the N4 interface or over the N29 interface (e.g., depending on the communication network structure); the UE device's properties are associated with its private IP address, but a third-party application (e.g., running on a server that is external to and/or remote from the UE device, such as a web server) receives modified packets having a public IP address that replaces the private IP address of the UE device; and such application may be able to utilize the IP Address Resolver which constructs and provides, in real time or in near-real-time, the relation or the correlation or the association between a particular private IP address and a corresponding public IP address (with a Port number or a Port block range) in order to ensure that such application provides the correct service or the suitable service to that UE device. The IP Address Resolver thus enables another application or unit or server, to select a particular mode of operation in order to serve that particular UE device, and/or to select or apply a particular set of operations that is suitable for that particular UE device having that particular private IP address.

Some embodiments provide a system comprising: an Internet Protocol (IP) address resolver unit, configured to remotely determine a private IP address of a remote User Equipment (UE) device; wherein said UE device generates and sends out an original IP packet having said private IP address as a Source Address filed of said original IP packet; wherein said original IP packet is modified by a User Plane Function (UPF) unit of a cellular communication network which replaces content of said Source Address field of the new IP packet with a replacement public IP address and a range of port numbers; wherein the IP address resolver unit is connected in said cellular communication network, upstream relative to said UPF unit and to said UE device, and wherein said IP address resolver unit is not in direct communication with said UE device; wherein the IP address resolver unit is further configured to send, to a remote Internet-connected server or to an Application Function (AF) unit of said cellular communication network, a message indicating (I) said private IP address of said UE device, and (II) the replacement public IP address and the range of port numbers that were assigned to said UE device by the UPF unit; wherein said message, sent by the IP address resolver unit, enables a remote application to perform a service towards said UE device based on the private IP address of said UE device instead of based on the replacement public IP address.

In some embodiments, the IP address resolver unit is configured to remotely determine the private IP address of the remote UE device, by performing an active IP address resolution process which generates and a new IP packet having a payload that comprises a string corresponding to the private IP address of said UE device.

In some embodiments, the IP address resolver unit is configured to remotely determine the private IP address of the remote UE device, by performing an active IP address resolution process which generates and a new IP packet having a payload that comprises a string corresponding to the private IP address of said UE device, and also having an IP header that includes a Source Address field that is an IP address of the IP address resolver unit itself.

In some embodiments, the IP address resolver unit obtains, from said cellular communication network, a modified IP packet which is a modified version of said new IP packet that was generated by the IP address resolver unit; wherein the modified IP packet maintains the payload of said new packet; wherein the Source Address of said modified IP packet was modified by the UPF unit to replace (i) the private IP address of the UE device with (ii) the replacement public IP address and the range of port numbers.

In some embodiments, the IP address resolver unit correlates between (i) the private IP address of the UE device, and (ii) the replacement public IP address and the range of port numbers as assigned by said UPF unit, based on analysis of said modified IP packet which inspects: (I) the Source Address field of said modified IP packet, and (II) the payload of said modified IP packet which stores the private IP address of the UE device.

In some embodiments, the IP address resolver unit obtains the private IP address of said UE device by monitoring IP packets transported on an N4 interface of said cellular communication network; wherein the IP address resolver unit injects said new IP packet over an N3 interface of said cellular communication network, and wherein the IP address resolver obtains the replacement public IP address of the UE device over an N6 interface of said cellular communication network.

In some embodiments, the IP address resolver unit obtains the private IP address of said UE device by monitoring IP packets transported on an N29 interface of said cellular communication network; wherein the IP address resolver unit injects said new IP packet over an N3 interface of said cellular communication network, and wherein the IP address resolver obtains the replacement public IP address of the UE device over an N6 interface of said cellular communication network.

In some embodiments, the IP address resolver unit is configured to correlate between (i) said private IP address of said UE device, and (ii) the replacement public IP address and the range of port numbers that were assigned to said UE device by the UPF unit; without generating and without sending any new IP packet from said IP address resolver unit, by performing a comparison among IP headers of a plurality of IP packets that are relayed by said UPF unit on behalf of said UE device.

In some embodiments, the IP address resolver unit is configured to correlate between (i) said private IP address of said UE device, and (ii) the replacement public IP address and the range of port numbers that were assigned to said UE device by the UPF unit; without generating and without sending any new IP packet from said IP address resolver unit, by performing a comparison between: (i) a first IP header of a first IP packet obtained by said IP resolver unit over an N3 interface of said cellular communication network, and (ii) a second IP header of a second IP packet obtained by said IP resolver unit over an N6 interface of said cellular communication network.

In some embodiments, the IP address resolver unit is configured to correlate between (i) said private IP address of said UE device, and (ii) the replacement public IP address and the range of port numbers that were assigned to said UE device by the UPF unit; without generating and without sending any new IP packet from said IP address resolver unit, by performing an Inverted Exclusive OR (!XOR) comparison between: (i) a first IP header of a first IP packet obtained by said IP resolver unit over an N3 interface of said cellular communication network, and (ii) a second IP header of a second IP packet obtained by said IP In some embodiments, the IP address resolver unit is configured to determine that, out of two or more IP packets that result in a positive comparison result, a particular IP packet having an earliest time-stamp has the private IP address of the UE device in its Source Address field; and that one or more IP packets that have a subsequent time-stamp have the replacement public IP address of the UE device in their Source Address field.

In some embodiments, the IP address resolver unit is configured to perform said comparison with regard to only a segment of N bytes of IP packet headers which begins at a particular Offset Value from a beginning of the IP packet headers.

In some embodiments, the IP address resolver unit is configured to store and update in real time a queue of IP packets that were monitored and that the IP address resolver did not yet resolve the private IP address of a source UE device of said IP packets; wherein an IP packet is removed from said queue upon a determination by the IP address resolver unit of a correlation between a particular private IP address and a particular replacement public IP address.

In some embodiments, the IP address resolver unit is configured store and update an IP Addresses Map which includes a record indicating a correlation between (i) a particular private IP address and (ii) a particular replacement public IP address; wherein said record is removed by the IP address resolver unit from the IP Address Map upon receiving a PDU Session Release request over an N4 interface or over an N29 interface of said cellular communication network.

In some embodiments, the IP address resolver unit is configured to receive an IP address mapping subscription request from said remote Internet-connected server, and to update a record to indicate that said remote Internet-connected server is now subscribed to IP address mapping notifications; wherein the IP address resolver unit is configured to automatically send said message to said remote Internet-connected server, based on said record indicating that said remote Internet-connected server is now subscribed to IP address mapping notifications.

In some embodiments, said IP address mapping subscription request, received by the IP address resolver unit from the remote Internet-connected server, comprises at least: a callback Uniform Resource Identifier (URI), and one or more parameters selected from the group consisting of: an indication to subscribe for IP address mapping of all UE devices, a SUPI value of a particular UE device, a GPSI value of a particular UE device, a list of SUPI values of a plurality of UE devices, a list of GPSI values of a plurality of UE devices.

In some embodiments, said IP address mapping subscription request, received by the IP address resolver unit from the remote Internet-connected server, comprises at least: a callback Uniform Resource Identifier (URI), and one or more parameters selected from the group consisting of: a pair of (i) public IP address, and (ii) port number, of a particular UE device; a pair of (i) public IP address, and (ii) port number, of a particular destination; a Data Network Name (DNN) value; a Tracking Area Index (TAI) value.

In some embodiments, the IP address resolver unit is configured to send said message to said remote Internet-connected server, wherein said remote Internet-connected server is not subscribed to receive IP address mapping messages from said IP address resolver unit, in response to a GET request that said IP address resolver unit receives from said remote Internet-connected server; wherein said GET request includes one or more parameters selected from the group consisting of: an indication to subscribe for IP address mapping of all UE devices, a SUPI value of a particular UE device, a GPSI value of a particular UE device, a list of SUPI values of a plurality of UE devices, a list of GPSI values of a plurality of UE devices.

In some embodiments, the IP address resolver unit is configured to send said message to said remote Internet-connected server, wherein said remote Internet-connected server is not subscribed to receive IP address mapping messages from said IP address resolver unit, in response to a GET request that said IP address resolver unit receives from said remote Internet-connected server; wherein said GET request includes one or more parameters selected from the group consisting of: a pair of (i) public IP address, and (ii) port number, of a particular UE device; a pair of (i) public IP address, and (ii) port number, of a particular destination; a Data Network Name (DNN) value; a Tracking Area Index (TAI) value.

In some embodiments, the IP address resolver unit is configured to automatically send said message to an Application Function (AF) unit of said cellular communication network, based on a record indicating that said AF unit is subscribed to receive dynamic real-time IP address mapping notifications from said IP address resolver unit.

In some embodiments, the IP address resolver unit is configured to perform a process of Active Resolution of IP Addresses, performed by (I) obtaining the private IP address of the UE device via an N29 interface or an N3 interface of said cellular communication network; and then (II) injecting a new IP packet on the N3 interface of said cellular communication network, wherein a Source Address in the IP header of said new IP packet is identical to the private IP address of the UE device, and wherein a Destination Address in the IP header of said new IP packet is identical to the IP address of the IP address resolver unit itself; and then (III) obtaining the replacement public IP address via an N6 interface of said cellular communication network.

In some embodiments, the IP address resolver unit is configured to perform a process of Passive Resolution of IP Addresses, performed by comparing between (I) a portion of an IP header of a first IP packet obtained by the IP resolver unit on an N3 interface of said cellular communication network, and (II) a corresponding portion of an IP header of a second IP packet obtained by the IP resolver unit on an N6 interface of said cellular communication network; wherein the IP address resolver unit is configured to determine that, if a result of said comparing is positive, then the IP header of the first IP packet indicates in its Source Address field the private IP address of said UE device, and the IP header of the second IP packet indicates in its Source Address field the replacement public IP address that was assigned by the UPF unit to said UE device.

In some embodiments, the IP address resolver unit is configured to perform a process of Resolution of IP Addresses; while the IP address resolver unit is connected in series over an N6 interface of said cellular communication network between (i) the UPF unit of the cellular communication network, and (ii) an entry node of the Internet; and while the IP address resolver is also connected over an N29 interface or over an N4 interface to a Session Management Function (SMF) unit of said cellular communication network; and while the IP address resolver is also connected via an additional link to an N3 interface that precedes the UPF unit and connects a Radio Access Network (RAN) to the UPF unit.

In some embodiments, the IP address resolver unit is configured to perform a process of Resolution of IP Addresses; while the IP address resolver is connected in parallel to an N6 interface of said cellular communication network that connects (i) the UPF unit of the cellular communication network and (ii) an entry node of the Internet; and while the IP address resolver unit is also connected over an N29 interface or over an N4 interface to a Session Management Function (SMF) unit of said cellular communication network, and while the IP address resolver is also connected via an additional link to an N3 interface that precedes the UPF unit and connects a Radio Access Network (RAN) to the UPF unit.

In some embodiments, a method comprises: at an Internet Protocol (IP) address resolver unit, remotely determining a private IP address of a remote User Equipment (UE) device; wherein said UE device generates and sends out an original IP packet having said private IP address as a Source Address filed of said original IP packet; wherein said original IP packet is modified by a User Plane Function (UPF) unit of a cellular communication network, which replaces content of said Source Address field of said original IP packet with a replacement public IP address and a range of port numbers; wherein the IP address resolver unit is connected in said cellular communication network, upstream relative to said UPF unit and to said UE device, and wherein said IP address resolver unit is not in direct communication with said UE device; wherein the method further comprises: sending by said IP address resolver unit, to a remote Internet-connected server, a message indicating (i) said private IP address of said UE device, and (ii) the replacement public IP address and the range of port numbers that were assigned to said UE device by the UPF unit; wherein said message, sent by the IP address resolver unit, enables a remote application to perform a service towards said UE device based on the private IP address of said UE device instead of based on the replacement public IP address.

Some embodiments provide a non-transitory storage medium having stored thereon instructions that, when executed by a processor or a machine, cause the processor or the machine to perform a method as described above or herein.

Some embodiments comprise a non-transitory storage medium having stored thereon instructions that, when executed by one or more hardware processors, cause the one or more hardware processors to perform a method as described above.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments include a system comprising: one or more processors configured to execute code; wherein the one or more processors are operably associated with one or more memory units configured to store code; wherein the one or more processors are configured to perform a method as described above and/or herein.

Any reference above or herein to a parameter, typically indicated by a letter such as M or T or P or the like, or by a letter and a numeral such as T1 or P2 or the like, may relate to a pre-defined or pre-configured parameter or constant or value or threshold value; or to a hard-coded value or constant; or, in some embodiments, to a user-configurable or administrator-configurable or programmer-configurable value or threshold value; or, in some embodiments, to a dynamically-configurable and/or automatically-modified value or threshold value, which may be dynamically modified and/or adjusted by the system automatically or autonomously if one or more pre-defined conditions hold true and/or based on one or more pre-defined threshold value modification rules which are enforced by a Parameters/Threshold Values Modification Unit or other suitable component.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Units, components and/or devices described above or herein, may include, or may be implemented by using one or more hardware units and/or software units; for example, a Central Processing Unit (CPU), a Digital Signal Processor (DSP), a processor, a processing core, a controller, a logic unit, a memory unit (e.g., Random Access Memory (RAM), Flash memory), a storage unit (e.g., Hard Disk Drive (HDD), Solid State Drive (SDD), Flash-based storage unit), one or more input units (e.g., keyboard, keypad, touch-pad, touch-screen, microphone), one or more output units (e.g., screen, touch-screen, display unit, audio speakers), one or more transceivers (e.g., cellular transceiver, Wi-Fi transceiver, Bluetooth transceiver, wireless transceiver, wired transceiver), power source (e.g., battery, rechargeable battery, power cell, mains electricity); an Operating System (OS), applications, drivers; one or more units such as a Global Positioning System (GPS) unit, an accelerometer, a gyroscope, a compass unit, a spatial-orientation sensor, a location-finding sensor, or the like.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments, may be combined with, or may be utilized in combination with, one or more other functions, operations, components and/or features described herein with reference to one or more other embodiments. Some embodiments may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
an Internet Protocol (IP) address resolver unit,
configured to remotely determine a private IP address of a remote User Equipment (UE) device,
wherein said UE device generates and sends out an original IP packet having said private IP address as a Source Address filed of said original IP packet,
wherein said original IP packet is modified by a User Plane Function (UPF) unit of a cellular communication network which replaces content of said Source Address field of the new IP packet with a replacement public IP address and a range of port numbers;
wherein the IP address resolver unit is connected in said cellular communication network, upstream relative to said UPF unit and to said UE device, and wherein said IP address resolver unit is not in direct communication with said UE device;
wherein the IP address resolver unit is further configured to send, to a remote Internet-connected server or to an Application Function (AF) unit of said cellular communication network, a message indicating (I) said private IP address of said UE device, and (II) the replacement public IP address and the range of port numbers that were assigned to said UE device by the UPF unit; wherein said message, sent by the IP address resolver unit, enables a remote application to perform a service towards said UE device based on the private IP address of said UE device instead of based on the replacement public IP address.

2. The system of claim 1,
wherein the IP address resolver unit is configured to remotely determine the private IP address of the remote UE device, by performing an active IP address resolution process which generates and a new IP packet having a payload that comprises a string corresponding to the private IP address of said UE device.

3. The system of claim 1,
wherein the IP address resolver unit is configured to remotely determine the private IP address of the remote UE device, by performing an active IP address resolution process which generates and a new IP packet having a payload that comprises a string corresponding to the private IP address of said UE device, and also having an IP header that includes a Source Address field that is an IP address of the IP address resolver unit itself.

4. The system of claim 3, wherein the IP address resolver unit obtains, from said cellular communication network, a modified IP packet which is a modified version of said new IP packet that was generated by the IP address resolver unit;

wherein the modified IP packet maintains the payload of said new packet;

wherein the Source Address of said modified IP packet was modified by the UPF unit to replace (i) the private IP address of the UE device with (ii) the replacement public IP address and the range of port numbers.

5. The system of claim 4, wherein the IP address resolver unit correlates between (i) the private IP address of the UE device, and (ii) the replacement public IP address and the range of port numbers as assigned by said UPF unit, based on analysis of said modified IP packet which inspects: (I) the Source Address field of said modified IP packet, and (II) the payload of said modified IP packet which stores the private IP address of the UE device.

6. The system of claim 5, wherein the IP address resolver unit obtains the private IP address of said UE device by monitoring IP packets transported on an N4 interface of said cellular communication network;

wherein the IP address resolver unit injects said new IP packet over an N3 interface of said cellular communication network, and wherein the IP address resolver obtains the replacement public IP address of the UE device over an N6 interface of said cellular communication network.

7. The system of claim 5, wherein the IP address resolver unit obtains the private IP address of said UE device by monitoring IP packets transported on an N29 interface of said cellular communication network;

wherein the IP address resolver unit injects said new IP packet over an N3 interface of said cellular communication network, and wherein the IP address resolver obtains the replacement public IP address of the UE device over an N6 interface of said cellular communication network.

8. The system of claim 1, wherein the IP address resolver unit is configured to correlate between (i) said private IP address of said UE device, and (ii) the replacement public IP address and the range of port numbers that were assigned to said UE device by the UPF unit, without generating and without sending any new IP packet from said IP address resolver unit, by performing a comparison among IP headers of a plurality of IP packets that are relayed by said UPF unit on behalf of said UE device.

9. The system of claim 1, wherein the IP address resolver unit is configured to correlate between (i) said private IP address of said UE device, and (ii) the replacement public IP address and the range of port numbers that were assigned to said UE device by the UPF unit, without generating and without sending any new IP packet from said IP address resolver unit, by performing a comparison between: (i) a first IP header of a first IP packet obtained by said IP resolver unit over an N3 interface of said cellular communication network, and (ii) a second IP header of a second IP packet obtained by said IP resolver unit over an N6 interface of said cellular communication network.

10. The system of claim 1, wherein the IP address resolver unit is configured to correlate between (i) said private IP address of said UE device, and (ii) the replacement public IP address and the range of port numbers that were assigned to said UE device by the UPF unit, without generating and without sending any new IP packet from said IP address resolver unit, by performing an Inverted Exclusive OR (!XOR) comparison between: (i) a first IP header of a first IP packet obtained by said IP resolver unit over an N3 interface of said cellular communication network, and (ii) a second IP header of a second IP packet obtained by said IP address resolver unit.

11. The system of claim 10, wherein the IP address resolver unit is configured to determine that, out of two or more IP packets that result in a positive comparison result, a particular IP packet having an earliest time-stamp has the private IP address of the UE device in its Source Address field; and that one or more IP packets that have a subsequent time-stamp have the replacement public IP address of the UE device in their Source Address field.

12. The system of claim 11, wherein the IP address resolver unit is configured to perform said comparison with regard to only a segment of N bytes of IP packet headers which begins at a particular Offset Value from a beginning of the IP packet headers.

13. The system of claim 12, wherein the IP address resolver unit is configured to store and update in real time a queue of IP packets that were monitored and that the IP address resolver did not yet resolve the private IP address of a source UE device of said IP packets;

wherein an IP packet is removed from said queue upon a determination by the IP address resolver unit of a correlation between a particular private IP address and a particular replacement public IP address.

14. The system of claim 13, wherein the IP address resolver unit is configured store and update an IP Addresses Map which includes a record indicating a correlation between (i) a particular private IP address and (ii) a particular replacement public IP address;

wherein said record is removed by the IP address resolver unit from the IP Address Map upon receiving a PDU Session Release request over an N4 interface or over an N29 interface of said cellular communication network.

15. The system of claim 1, wherein the IP address resolver unit is configured to receive an IP address mapping subscription request from said remote Internet-connected server, and to update a record to indicate that said remote Internet-connected server is now subscribed to IP address mapping notifications;

wherein the IP address resolver unit is configured to automatically send said message to said remote Internet-connected server, based on said record indicating that said remote Internet-connected server is now subscribed to IP address mapping notifications.

16. The system of claim 15, wherein said IP address mapping subscription request, received by the IP address resolver unit from the remote Internet-connected server, comprises at least:

a callback Uniform Resource Identifier (URI), and
one or more parameters selected from the group consisting of:
an indication to subscribe for IP address mapping of all UE devices,
a SUPI value of a particular UE device,
a GPSI value of a particular UE device,
a list of SUPI values of a plurality of UE devices,
a list of GPSI values of a plurality of UE devices.

17. The system of claim 16,
wherein said IP address mapping subscription request, received by the IP address resolver unit from the remote Internet-connected server, comprises at least:
a callback Uniform Resource Identifier (URI), and
one or more parameters selected from the group consisting of:
a pair of (i) public IP address, and (ii) port number, of a particular UE device;
a pair of (i) public IP address, and (ii) port number, of a particular destination;
a Data Network Name (DNN) value;
a Tracking Area Index (TAI) value.

18. The system of claim 1,
wherein the IP address resolver unit is configured to send said message to said remote Internet-connected server, wherein said remote Internet-connected server is not subscribed to receive IP address mapping messages from said IP address resolver unit,
in response to a GET request that said IP address resolver unit receives from said remote Internet-connected server;
wherein said GET request includes one or more parameters selected from the group consisting of:
an indication to subscribe for IP address mapping of all UE devices,
a SUPI value of a particular UE device,
a GPSI value of a particular UE device,
a list of SUPI values of a plurality of UE devices,
a list of GPSI values of a plurality of UE devices.

19. The system of claim 1,
wherein the IP address resolver unit is configured to send said message to said remote Internet-connected server, wherein said remote Internet-connected server is not subscribed to receive IP address mapping messages from said IP address resolver unit,
in response to a GET request that said IP address resolver unit receives from said remote Internet-connected server;
wherein said GET request includes one or more parameters selected from the group consisting of:
a pair of (i) public IP address, and (ii) port number, of a particular UE device;
a pair of (i) public IP address, and (ii) port number, of a particular destination;
a Data Network Name (DNN) value;
a Tracking Area Index (TAI) value.

20. The system of claim 1,
wherein the IP address resolver unit is configured to automatically send said message to an Application Function (AF) unit of said cellular communication network, based on a record indicating that said AF unit is subscribed to receive dynamic real-time IP address mapping notifications from said IP address resolver unit.

21. The system of claim 1,
wherein the IP address resolver unit is configured to perform a process of Active Resolution of IP Addresses, performed by (I) obtaining the private IP address of the UE device via an N29 interface or an N3 interface of said cellular communication network; and then (II) injecting a new IP packet on the N3 interface of said cellular communication network, wherein a Source Address in the IP header of said new IP packet is identical to the private IP address of the UE device, and wherein a Destination Address in the IP header of said new IP packet is identical to the IP address of the IP address resolver unit itself; and then (III) obtaining the replacement public IP address via an N6 interface of said cellular communication network.

22. The system of claim 1,
wherein the IP address resolver unit is configured to perform a process of Passive Resolution of IP Addresses, performed by comparing between (I) a portion of an IP header of a first IP packet obtained by the IP resolver unit on an N3 interface of said cellular communication network, and (II) a corresponding portion of an IP header of a second IP packet obtained by the IP resolver unit on an N6 interface of said cellular communication network;
wherein the IP address resolver unit is configured to determine that, if a result of said comparing is positive, then the IP header of the first IP packet indicates in its Source Address field the private IP address of said UE device, and the IP header of the second IP packet indicates in its Source Address field the replacement public IP address that was assigned by the UPF unit to said UE device.

23. The system of claim 1,
wherein the IP address resolver unit is configured to perform a process of Resolution of IP Addresses,
while the IP address resolver unit is connected in series over an N6 interface of said cellular communication network between (i) the UPF unit of the cellular communication network, and (ii) an entry node of the Internet,
and while the IP address resolver unit is also connected over an N29 interface or over an N4 interface to a Session Management Function (SMF) unit of said cellular communication network,
and while the IP address resolver unit is also connected via an additional link to an N3 interface that precedes the UPF unit and connects a Radio Access Network (RAN) to the UPF unit.

24. The system of claim 1,
wherein the IP address resolver unit is configured to perform a process of Resolution of IP Addresses,
while the IP address resolver unit is connected in parallel to an N6 interface of said cellular communication network that connects (i) the UPF unit of the cellular communication network and (ii) an entry node of the Internet,
and while the IP address resolver unit is also connected over an N29 interface or over an N4 interface to a Session Management Function (SMF) unit of said cellular communication network,
and while the IP address resolver unit is also connected via an additional link to an N3 interface that precedes the UPF unit and connects a Radio Access Network (RAN) to the UPF unit.

25. A method comprising:
at an Internet Protocol (IP) address resolver unit,
remotely determining a private IP address of a remote User Equipment (UE) device,
wherein said UE device generates and sends out an original IP packet having said private IP address as a Source Address filed of said original IP packet,
wherein said original IP packet is modified by a User Plane Function (UPF) unit of a cellular communication network, which replaces content of said Source Address field of said original IP packet with a replacement public IP address and a range of port numbers;
wherein the IP address resolver unit is connected in said cellular communication network, upstream relative to said UPF unit and to said UE device, and wherein said IP address resolver unit is not in direct communication with said UE device;
wherein the method further comprises:
sending by said IP address resolver unit, to a remote Internet-connected server, a message indicating (i) said private IP address of said UE device, and (ii) the replacement public IP address and the range of port numbers that were assigned to said UE device by the UPF unit; wherein said message, sent by the IP address resolver unit, enables a remote application to perform a service towards said UE device based on the private IP address of said UE device instead of based on the replacement public IP address.

26. A non-transitory storage medium having stored thereon instructions that, when executed by a processor, cause the processor to perform a method comprising:
at an Internet Protocol (IP) address resolver unit,
remotely determining a private IP address of a remote User Equipment (UE) device,
wherein said UE device generates and sends out an original IP packet having said private IP address as a Source Address filed of said original IP packet,
wherein said original IP packet is modified by a User Plane Function (UPF) unit of a cellular communication network, which replaces content of said Source Address field of said original IP packet with a replacement public IP address and a range of port numbers;
wherein the IP address resolver unit is connected in said cellular communication network, upstream relative to said UPF unit and to said UE device, and wherein said IP address resolver unit is not in direct communication with said UE device;
wherein the method further comprises:
sending by said IP address resolver unit, to a remote Internet-connected server, a message indicating (i) said private IP address of said UE device, and (ii) the replacement public IP address and the range of port numbers that were assigned to said UE device by the UPF unit; wherein said message, sent by the IP address resolver unit, enables a remote application to perform a service towards said UE device based on the private IP address of said UE device instead of based on the replacement public IP address.

* * * * *